US009734403B2

(12) United States Patent
Bare et al.

(10) Patent No.: US 9,734,403 B2
(45) Date of Patent: Aug. 15, 2017

(54) AUGMENTED REALITY DISPLAY OF DYNAMIC TARGET OBJECT INFORMATION

(71) Applicant: Huntington Ingalls, Inc., Newport News, VA (US)

(72) Inventors: Brian Bare, Newport News, VA (US); Jonathan Martin, Newport News, VA (US); Paul Sells, Los Angeles, CA (US); Patrick Ryan, Newport News, VA (US); Mark Lawrence, Newport News, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 256 days.

(21) Appl. No.: 14/695,636

(22) Filed: Apr. 24, 2015

(65) Prior Publication Data

US 2015/0310279 A1  Oct. 29, 2015

Related U.S. Application Data

(60) Provisional application No. 61/984,159, filed on Apr. 25, 2014, provisional application No. 61/997,793, (Continued)

(51) Int. Cl.
*G06K 9/00* (2006.01)
*G06T 19/00* (2011.01)
*G01S 5/00* (2006.01)

(52) U.S. Cl.
CPC ........ *G06K 9/00671* (2013.01); *G06T 19/006* (2013.01); *G01S 5/00* (2013.01);
(Continued)

(58) Field of Classification Search
CPC ............... G06T 19/006; G06T 2200/24; G06T 2210/61; G06K 9/00671; G01S 15/00; G01S 15/89; G01S 5/00; G01S 2205/00
See application file for complete search history.

(56) References Cited

U.S. PATENT DOCUMENTS 7,852,355 B2  12/2010  Friedrich
8,248,467 B1   8/2012  Ganick et al.
(Continued)

FOREIGN PATENT DOCUMENTS

WO   WO 2013/023705   2/2013
WO   WO 2013/049248   4/2013
WO   WO 2014/015378   1/2014

OTHER PUBLICATIONS

U.S. Appl. No. 61/857,391 of 2015/0029819 A1.*
(Continued)

*Primary Examiner* — Michelle L Sams
(74) *Attorney, Agent, or Firm* — Hunton & Williams LLP

(57) ABSTRACT

A method for providing target object information to a mobile device user is presented. The method includes receiving a request for target object information from a mobile device, determining the pose of the mobile interface device relative to the target object, and obtaining target object data for one or more measurable target object parameters (e.g., surface topography). The target object data is used to assemble augmented reality information configured for viewing in conjunction with a real-time view of the target object captured by the mobile interface device. The target object augmented reality information is then transmitted to the mobile device for display to the user.

25 Claims, 5 Drawing Sheets

Related U.S. Application Data filed on Jun. 9, 2014, provisional application No. 62/025,041, filed on Jul. 16, 2014, provisional application No. 62/036,762, filed on Aug. 13, 2014.

(52) U.S. Cl.
CPC ....... *G01S 2205/00* (2013.01); *G06T 2200/24* (2013.01); *G06T 2210/61* (2013.01)

(56) References Cited

U.S. PATENT DOCUMENTS

| | | |
|---|---|---|
| 8,542,906 B1 | 9/2013 | Persson et al. |
| 2002/0075451 A1 | 6/2002 | Ruiz |
| 2002/0191004 A1 | 12/2002 | Ebersole |
| 2003/0210228 A1 | 11/2003 | Ebersole |
| 2007/0050115 A1 | 3/2007 | Discenzo et al. |
| 2007/0081695 A1 | 4/2007 | Foxlin |
| 2007/0088526 A1 | 4/2007 | Friedrich et al. |
| 2009/0095086 A1* | 4/2009 | Kessler ............... G01N 29/069 73/606 |
| 2009/0215471 A1* | 8/2009 | Sands .................. G01S 13/876 455/457 |
| 2010/0190449 A1 | 7/2010 | Suzuki |
| 2010/0238161 A1 | 9/2010 | Varga |
| 2010/0321389 A1 | 12/2010 | Gay |
| 2011/0115816 A1* | 5/2011 | Brackney ............. G06Q 10/06 345/629 |
| 2011/0164163 A1* | 7/2011 | Bilbrey ................ G06F 1/1694 348/333.01 |
| 2011/0187744 A1 | 8/2011 | Kim et al. |
| 2011/0216090 A1 | 9/2011 | Woo et al. |
| 2011/0306412 A1 | 12/2011 | Ehara et al. |
| 2012/0001938 A1 | 1/2012 | Sandberg |
| 2012/0015730 A1* | 1/2012 | Watkins, Jr. ............ A63F 13/65 3/65 |
| 2012/0098754 A1 | 4/2012 | Kim |
| 2012/0098859 A1 | 4/2012 | Lee et al. |
| 2013/0113827 A1 | 5/2013 | Forutanpour et al. |
| 2013/0113993 A1 | 5/2013 | Dagit, III |
| 2013/0136300 A1 | 5/2013 | Wagner et al. |
| 2013/0154824 A1 | 6/2013 | Cai |
| 2013/0162632 A1 | 6/2013 | Varga |
| 2013/0231779 A1 | 9/2013 | Purkayastha et al. |
| 2013/0253824 A1 | 9/2013 | Yang |
| 2013/0321245 A1* | 12/2013 | Harper .................... G06F 3/147 345/7 |
| 2013/0342568 A1 | 12/2013 | Ambrus |
| 2014/0063055 A1 | 3/2014 | Osterhout |
| 2014/0071163 A1 | 3/2014 | Kinnebrew et al. |
| 2014/0118397 A1 | 5/2014 | Lee et al. |
| 2014/0188333 A1* | 7/2014 | Friend .................... E02F 9/261 701/34.4 |
| 2014/0267417 A1 | 9/2014 | Bare et al. |
| 2014/0280199 A1 | 9/2014 | Bare et al. |
| 2014/0282911 A1 | 9/2014 | Bare et al. |
| 2015/0029819 A1* | 1/2015 | Yacoubian ........... G01N 21/171 367/7 |
| 2015/0188984 A1 | 7/2015 | Mullins |
| 2015/0283700 A1* | 10/2015 | Trautman .................. B25J 9/16 700/245 |
| 2015/0294506 A1 | 10/2015 | Bare et al. |

OTHER PUBLICATIONS

PCT International Search Report, International Application No. PCT/US15/025734, dated Jul. 30, 2015, pp. 1-2.
International Search Report of the International Searching Authority issued in PCT/US2015/044838, dated Nov. 12, 2015 (2 pages).
Hammad, "Distributed Augmented Reality for Visualising Collaborative Construction Tasks", Journal of computing in civil engineering, No. 6, Oct. 15, 2009, pp. 171-183.
Chen et al., "A Smart Crane Operations Assistance System Using Augmented Reality Technology", Proceedings of 28 Internation Symposium on Automation and Robotics in Construction, 2011, pp. 643-649.
International Search Report of the International Searching Authority issued in PCT/US2015/040562, dated Oct. 15, 2015 (2 pages).
International Search Report of the International Searching Authority issued in PCT/US2015/025784, dated Jul. 20, 2015 (2 pages).
International Search Report of the International Searching Authority issued in PCT/US2015/033972, dated Aug. 21, 2015 (2 pages).

* cited by examiner

AUGMENTED REALITY DISPLAY OF DYNAMIC TARGET OBJECT INFORMATION

CROSS-REFERENCE TO RELATED APPLICATIONS

This application claims priority to U.S. Provisional Application Nos. 61/984,159, filed Apr. 25, 2014; 61/997,793, filed Jun. 9, 2014; 62/025,041, filed Jul. 16, 2014; and 62/036,762, filed Aug. 13, 2014, the complete disclosures of which are incorporated herein by reference in their entirety. The embodiments in this application are related to those in U.S. application Ser. No. 14/686,427, filed Apr. 14, 2015, the complete disclosure of which is incorporated herein by reference.

BACKGROUND OF THE INVENTION

This application relates generally to the use of augmented reality to display changes in dynamic environments and, more particularly, to the use of augmented reality to provide information and direction to users operating in or manipulating such dynamic environments.

Augmented reality (AR) provides a view of a physical, real-world environment whose elements are augmented (or supplemented) by computer-generated sensory input such as sound, text, graphics, or video. In a typical AR application, a data processor reviews a camera-captured image for cues that trigger the display of additional information and images along with a display of the captured image.

While AR is useful for conveying information via a static display, it is particularly useful in dynamic situations and environments where images are captured and displayed in real-time and the information to be displayed using AR (hereinafter, "AR information") changes. The ability to provide constant update to the AR information in response to changes in the environment and location and relative positioning of the user's display provides great utility in various applications including construction, repair, maintenance, and safety.

A particularly significant example of a dynamic spatial environment is the space on board a large ship. Not only does the ship itself move, its structure is flexible so that the position of a particular compartment or supporting structure in one part of the ship may change relative to other parts of the ship. Similar dynamic behavior can occur in tall buildings, construction sites, outdoor processing plants, roadways, bridges, etc.

In addition to changes in environmental structure, dynamic environments experience changes in an essentially infinite number of conditions. These can be as simple as changes in measurable atmospheric conditions (e.g., temperature and pressure) or as complex as changes in the surface topography of a metal sheet undergoing a welding operation.

For as many different possible conditions there are in a given environment, there are as many instances where rapid communication of changes in such conditions to individuals operating in or on that environment is essential.

SUMMARY OF THE INVENTION

An illustrative aspect of the invention provides a method for providing target object information to a mobile interface device user in a dynamic structural environment. The method comprises receiving on a central data processor from the mobile interface device over a communication network a request for target object information. The request includes information usable by the central data processor to determine the pose of the mobile interface device relative to the target object. The method further comprises determining the pose of the mobile interface device relative to the target object and obtaining target object data for one or more measurable target object parameters. The method still further comprises assembling AR target object information for transmission to and display on the mobile interface device. The AR target object information is assembled using the target object data and is configured for viewing in conjunction with a real-time view of the target object captured by the mobile interface device. The method also comprises transmitting the AR target object information to the mobile interface device.

Another illustrative aspect of the invention provides an automated system for providing target object information to a mobile interface device in a dynamic structural environment. The system comprises at least one mobile interface device configured for variable disposition within the dynamic structural environment, capturing information about the target object within the structural environment, and transmitting the target object information over a network. The system further comprises a local positioning system in communication with the at least one mobile interface device via the network and configured to provide information usable to determine a mobile interface device pose relative to the target object. A central processor comprising at least one data processing machine is in communication with the at least one mobile interface device and the local positioning system via the network. The central processor is configured for receiving from a requesting one of the at least one mobile interface device a request for target object information, the request including information usable to determine the mobile interface device pose relative to the target object. The central processor is also configured for determining the pose of the requesting mobile interface device relative to the target object and obtaining target object data for one or more measurable target object parameters. The central processor is further configured for AR target object information for transmission to and display on the requesting mobile interface device. The AR target object information is assembled using the target object data and being configured for viewing in conjunction with a real-time view of the target object captured by the requesting mobile interface device. The central processor is also configured for transmitting the AR environment information to the requesting mobile interface device.

Yet another illustrative aspect of the invention provides a method for providing surface topography information for a target object to a mobile interface device user in a dynamic structural environment. The method comprises receiving on a central data processor from the mobile interface device over a communication network a request for target object surface information. The request includes information usable by the central data processor to determine the pose of the mobile interface device relative to the target object. The method further comprises determining the pose of the mobile interface device relative to the target object, obtaining target object surface data, and assembling AR target object surface information for transmission to and display on the mobile interface device. The AR target object information is assembled using the target object surface data and is configured for viewing in conjunction with a real-time view of the target object captured by the mobile interface device.

the method also comprises transmitting the AR target object surface information to the mobile interface device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

The present invention provides methods and systems for real-time display of AR information on a mobile device immersed in and movable within a dynamic environment. The challenges presented by this scenario include determination of the location of and orientation of the mobile device within the environment, recognition of variations in the spatial geometry of the environment, and detection/identification of changes in other measurable parameters associated with the environment or objects within the environment.

While the invention will be described in connection with particular embodiments, it will be understood that the invention is not limited to these embodiments. On the contrary, it is contemplated that various alternatives, modifications and equivalents are included within the spirit and scope of the invention as described.

While the dynamic structural environments used in many of the examples and illustrative embodiments used herein to describe the invention relate to ships and other vessels, it will be understood that the invention is not limited to such environments. The invention can be used in, without limitation, land vehicles, buildings and any other static or dynamically variable structure.

The systems of the invention use AR as the primary medium for presenting environment-related information to a user. AR allows presentation of such information on the mobile interface device in graphical or textual form overlaid or adjacent an environmental area or object as it appears in the camera-generated view on the device screen.

Figure 1:
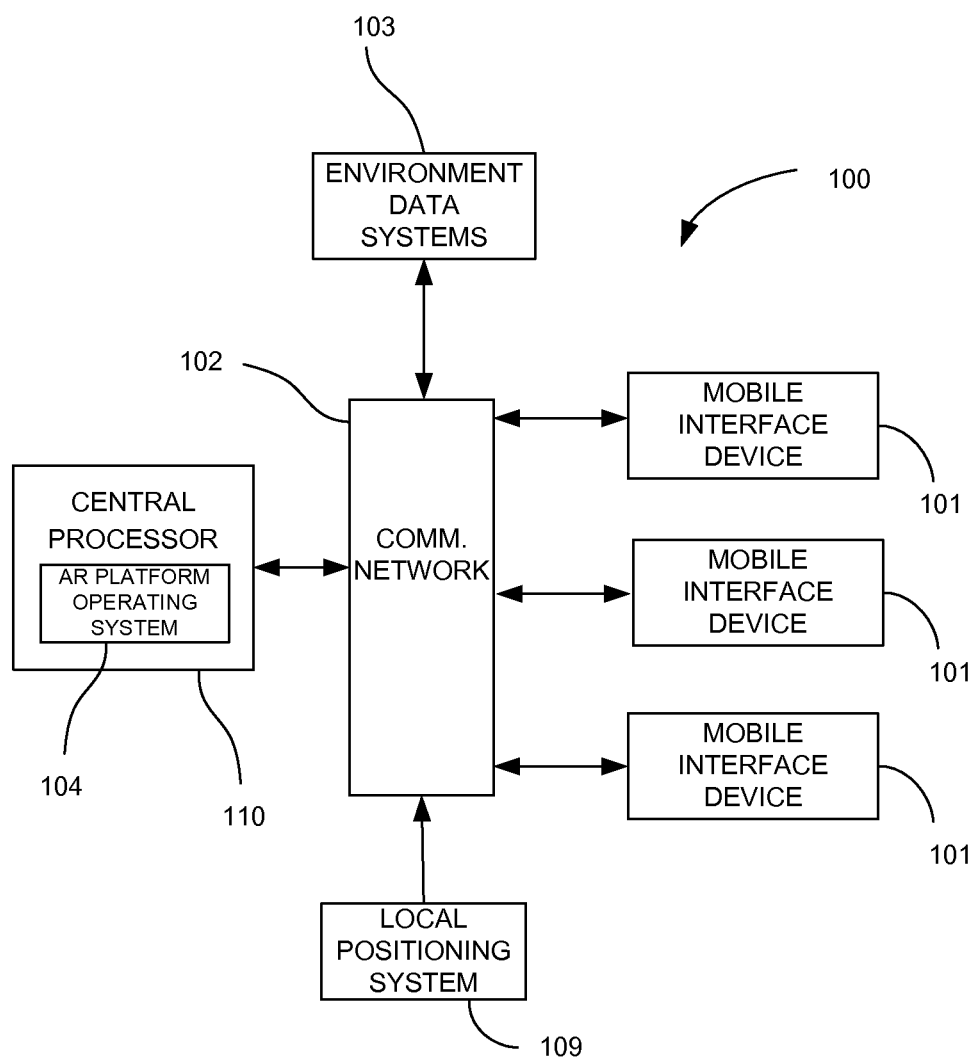
FIG. 1 is a schematic representation of a system for providing AR information to a mobile interface device according to an embodiment of the invention.

A generalized system 100 for generating and displaying real-time AR information according to an embodiment of the invention is illustrated in FIG. 1. The system 100 is configured for obtaining and storing information on a dynamic structural environment such as a ship or building and objects disposed within that environment. The system 100 comprises a central processor 110 in communication with one or more mobile interface devices 101 via a communication network 102. The central processor may include or be in communication with a relational database structure (not shown) as is described in U.S. patent application Ser. No. 14/210,650 (the "'650 application), filed on Mar. 14, 2014, the complete disclosure of which is incorporated herein by reference in its entirety. In general, the central processor 110 is configured to receive captured object information from the mobile interface devices 101 and to extract information relating to the environment or an object in the environment, generate AR information for display on a requesting mobile interface device, and transmit the AR information to the requesting mobile interface device 101.

The central processor 110 may include or be configured to receive information from a local positioning system 109 via the communications network 102 or a different network. The central processor may be configured to use the information from the local positioning system 109 in conjunction with information from a requesting mobile interface device 101 and known/stored structural information (e.g., a three dimensional model) to determine the pose of the mobile interface device 101 within the environment. As used herein, "pose" means the position (x,y,z) and orientation (θ,φ,ζ) of an object in a particular physical space. The system is configured to resolve spatial differences between the coordinate system established based on the known structural information and the data received from the local positioning system 109 that result from changes in the dynamic structure.

The central processor 110 is also configured to receive information from an environment data system 103 via the network 102 or another network. The environment data system 103 is configured for measurement or determination of parameters associated with the structural environment or an object or objects within the structural environment. As will be discussed in more detail, such parameters may include, but are not limited to spatially mapped or mappable data obtained from sensors (e.g., radiation or temperature sensors) with known locations in the structural environment, spatially mapped or mappable data (e.g., weight distribution or surface topography) associated with a particular object in the environment, and system or device status information (e.g., electrical circuit energization status). In some embodiments, the environmental data systems 103 may include a metrology system adapted to provide measurements of specific parameters for particular object types. The central processor 110 is configured to process information from the environmental data systems 103 and use it with the pose information for the requesting mobile interface device 101 to generate AR information that can be transmitted to the mobile interface device 101 for display.

In various embodiments of the invention, information processed by the central processor 110 may include asset location information from a global or local positioning system, visual or graphical information received from the mobile interface devices, observational information from users, and operational or other data from instrumentation systems associated with the environment or particular assets. Any or all of such information can be used by the central processor 110 to update object-related information and/or generate information for display via AR images that can be superimposed on the mobile device user's view of the environment or an object in the environment. The mobile interface devices used in the systems of the invention can make use of AR in a variety of ways that allow the user to conduct inspection, maintenance, repair, and replacement tasks in relation to particular assets. AR can also be used to assist a user in identifying safety hazards, locating objects, or simply navigating within the dynamic environment.

In some embodiments, the central processor 110 may be configured for processing information it receives for a particular object or structure in the environment and comparing that information to desired specifications or previously obtained information for that object or structure. Such information can be used to determine if a maintenance or other corrective operation should be performed. The central processor 110 may also be configured to generate AR representations of a deviation from the desired condition that can be displayed to mobile device user charged with correcting the deviation. As will be discussed in more detail hereafter, this could include any of various maintenance operations or corrective machining operations. In some embodiments, the environment data systems 103 may be configured to provide periodic or continuous updates to the central processor 110 regarding the status or condition of the object or structure undergoing such operations. This allows the central processor 110 to provide condition updates to the mobile device operator in real-time.

The mobile interface device 101 may be any mobile computing solution that is used by a user to facilitate communication with and display information from the central processor 110. The mobile interface device 101 may be, for example, a tablet computer, a smartphone, or a wearable heads-up display. The mobile interface device 101 may have features including, but not limited to a processor, a display (such as a screen), a vision sensor (such as a camera), a microphone, one or more speakers, and wireless communications capabilities. The mobile interface device 101 may be, in a particular embodiment, a wearable head-mounted device (HMD) such as that described in U.S. application Ser. No. 14/210,730, filed Mar. 14, 2014, the complete disclosure of which is incorporated herein by reference in its entirety. In preferred embodiments, the mobile interface device 101 is equipped or configured to display AR images/information to a user. The mobile interface device 101 may include one or more accelerometers or other motion detection sensors. Each mobile interface device 101 may include one or more unique identifiers. In some embodiments, some or all of the mobile interface devices 101 may include one or more local positioning receivers, image and object recognition, audio queues, or electromagnetic field (EMF) receivers or detectors (for GPS, WiFi, or RFID reception or light detection).

In some embodiments, the mobile interface device 101 may be configured to receive information from the local positioning system 109 and to determine its own pose relative to the environment. This capability may be provided to the mobile device 101 in addition to or instead of configuring the central processor 110 to establish the pose of the mobile device 101.

The communication network 102 may be a wireless network, a wired network or any combination of wireless network and wired network. In a preferred embodiment, the communications network 102 is a wireless communications network, allowing the mobile interface devices 101 to communicate wirelessly with the central processor 110. The communication network 102 may, in particular, be or include a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal.

The central processor 110 may be or comprise one or more servers, data processing machines, or network-enabled computers and may host an AR operating system 104. The AR operating system 104 may be configured to control the interaction of the hardware and software components of a relational database structure (not shown). The relational database structure is configured to provide a logical framework that allows digital information to be associated with physical objects. This framework includes addresses for both tangible objects as well as individual point addresses within a coordinate system for the structural environment. In an exemplary embodiment, this coordinate system is based on a three dimensional (3D) structural model of the environment (e.g., the ship or building). Preferably, the 3D model provides a complete detail of the environment including every space, room or compartment where objects may be disposed.

The AR operating system 104 is configured to assemble AR information for transmission to and display by the mobile device 101. The AR information is constructed using the processed environment data from the environment data systems 103 and the pose of the mobile device 101 using any of various techniques known in the art. The AR information may be presented for display as text or as graphical images that can be superimposed over real-time images captured by the mobile device 101. The AR information may be associated with specific parameters relating to the portion of the environment where the mobile device 101 is located or relating to an object or system near the mobile device 101 and/or with which the user of the mobile device 101 is interacting.

In particular embodiments, the AR information may include information on a target object that is usable by a mobile device user to conduct maintenance, construction, machining or other operations on the target object. As used herein, the term "target object" means an object or structure in a dynamic environment that can be identified by the system and associated with location, status, condition or other object-related information. In particular, the AR information may include information on deviations from a desired status or condition. In some embodiments, the AR information may be presented on a mobile device as an AR image superimposed over a camera image of the target structure or object to show physical deviations to the user in a clear visual manner.

The central processor 110 may be configured or may comprise a processor or processing module and computer executable software (e.g., on a tangible computer-readable medium) configured to perform various processing functions relating to object recognition, including feature extraction to extract lines, edges, ridges, or other localized interest points from an image; detection or segmentation to select a specific set of interest points within an image or segment multiple image regions that contain a specific object of interest; image recognition to categorize a detected object into a particular category; noise reduction; contrast enhancement; and/or space scaling, for example.

The relational database structure may include a domain coordinate management system that maintains spatial addresses for all spaces within the domain of the structural environment. The domain coordinate management system may be configured to receive spatial address information from both the local positioning system 109 and from the three dimensional structural model. The domain coordinate management system is configured to resolve spatial differences between the coordinate system established by the 3D model of the structure and any available telemetry data received from the local positioning system 109 as a result of changes in the dynamic structure. Such differences may be particularly significant in, for example, a large vessel underway at sea. Ships (particularly large ships) are not rigid bodies.

The local positioning system 109 is a system (complete or composite) that facilitates the establishment or estimation of the pose of a mobile interface device 101 within the coordinate system described or approximated by the three dimensional model of the structural environment. As is discussed in more detail in U.S. application Ser. No. 14/210,601, filed Mar. 14, 2014 (the "'601 application"), the complete disclosure of which is incorporated herein by reference in its entirety, pose may be accurately established using vision science-based algorithms. Such algorithms may recognize one or more unique pre-identified visual tracking cues within a physical space.

The local positioning system 109 may be or include any system capable of establishing the position and/or orientation of a mobile interface device relative to a structural environment coordinate system. This coordinate system may be, or may be based on, for example, a predetermined reference system for a ship or other structure. In some embodiments, the local positioning system 109 may comprise a light positioning system that operates by using light points positioned throughout the physical spaces of the vessel. An example of a light positioning system is described in U.S. Pat. No. 8,248,467, the complete disclosure of which is incorporated herein by reference in its entirety. In some embodiments, the local positioning system 109 may use electromagnetic or sound waves emanating from various points within the physical spaces in the structural environment. Examples of electromagnetic or sound waves include radio frequency identification (RFID) signals, radio signals, WiFi signals, audio tones, and/or sound waves. The local positioning system 109 may use unique images or recognizable visual features, quick response (QR) codes, bar codes, or reference points placed throughout the physical space of the structure.

The system 100 may use information from more than one local positioning system. Alternatively or in addition, the system 100 may receive and use information from a global positioning system (GPS) (not shown).

It will be understood that various processing components of the system 100 may be combined into a single processor or further subdivided into multiple processors or servers. It will be appreciated that in some cases, multiple instances of a particular component of the system 100 may be used. Moreover, the system 100 may include other devices not depicted in FIG. 1.

Figure 2:
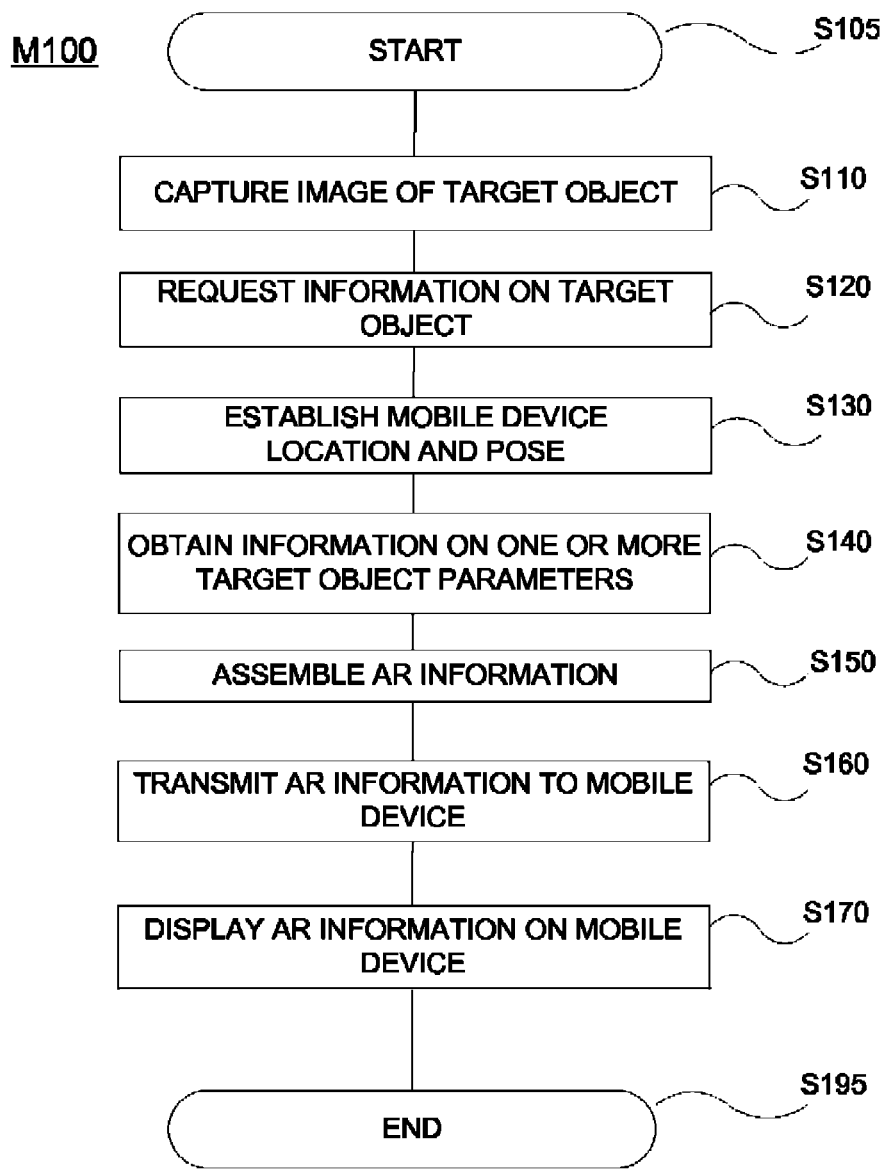
FIG. 2 is a flow diagram of a method of providing target object information to a mobile interface device in a dynamic structural environment according to an embodiment of the invention.

The system 100 can be used to provide a mobile device user with real-time AR information on the characteristics or condition of target objects disposed in a dynamic environment. With reference to FIG. 2, a generalized method M100 for providing such AR information to a mobile device user begins at S105. At S110, the user uses the mobile interface device 101 to capture a digital image of the target object and/or a portion of the environment in which the target object is disposed. At S120, a request for target object information is sent from the mobile interface device to a central processor 110 over a network 102. The request may include information usable by the central processor to determine the exact location and pose of the mobile interface device 101 relative to the target object. This information may include some or all of the digital image. At S130, the central processor 110 uses the request information along with information from the local positioning system 109 to establish the exact location and pose of the mobile device 101 relative to the target environment. In some embodiments, the pose of the mobile device 101 may be determined by the mobile device 101 itself. In such embodiments, pose information may be transmitted by the mobile device 101 to the central processor 110.

At S140, the central processor 110 obtains information on one or more target object-related parameters. Some or all of this information may be received from the environment data systems 103 or determined from information received from the mobile device 101 and/or the mobile device user. The information could, for example, be determined from a digital image received from the mobile device 101 as part of the information request. Alternatively, the information may be data from sensors located near or on or associated with the target object. The information may also be or include information on the status of a system of which the target object is a part. It will be understood that the information from the environment data systems 103 may be provided to the central processor 110 on a constant basis or may instead be provided in response to a request or query submitted by the central processor 110. The central processor 110 may also obtain previously stored information associated with the target object from a data storage module.

It will be understood that as part of or in addition to the action of obtaining target object information, the central processor may be required to process the information received from the mobile interface device 101 to specifically identify the target object and differentiate it from other objects in the environment. In some embodiments, this may be accomplished using object recognition techniques in conjunction with environment location information. In other embodiments, this may be accomplished through the use of unique identifiers or other indicia applied to or attached to the target object. Such indicia can be provided to the central processor 110 by the user or can be extracted from a captured digital image. Among other things, identification of the target object allows the central processor 110 to determine if previously stored information is available for that target object.

In some embodiments. the target object parameter information may include information on a particular characteristic or status that can be evaluated to determine if an operation should be performed on the target object by the mobile device user. In some cases, if it is determined that a maintenance or corrective operation is required or if it is already known that such an operation is required, the target object information may be information required by the mobile device user to perform the required operation.

At S150, the central processor 110 uses the target object information to assemble AR information for transmission to the mobile interface device 101. This action may include processing of raw data from the environment data systems into a form usable by the AR operating system 104 to construct the AR information. In some embodiments, the AR information includes a graphical representation of target object parameters as a visual display that can be superimposed over a real-time view of the target environment captured by the mobile interface device 101.

In some embodiments, the central processor 110 may be configured to determine the deviation of a current target object status or characteristic from a desired target object status or characteristic. This could, for example, be a deviation of measured performance or geometric parameters from what is specified for the target object. The central processor 110 may use this information to construct the AR information. In an exemplary embodiment, the AR information could include an AR image that visually shows the deviation in conjunction with a real-time view of the target object. In some embodiments, the AR information could be or include a visual representation of the desired target object condition to assist the mobile device user in conducting an operation intended to bring the target object in conformance with that desired condition.

At S160, the central processor 110 transmits the AR information to the mobile interface device 101 where it is displayed to the mobile device user at S170. The method ends at S195.

As previously discussed, the AR information may be presented as text displayable in conjunction with the visual display of the target object or as graphical imagery that can be superimposed over an appropriate portion of the visual display. The graphical imagery could, for example, be or include one or more graphical representations of the parameters measured by the environmental data systems, a representation of desired characteristics, or the above-described deviation from desired characteristics.

It will be understood that, once requested, some or all of the actions of the method M100 may be repeated to periodically or continuously provide real-time target object information to the mobile interface device 101. This assures that the user is aware of variations due to changes in the location and pose of the mobile device relative to the dynamic environment and changes target object parameters. In some embodiments, the actions of obtaining target parameter data, assembling AR information and transmitting the AR information may be repeated after some or all of an operation on the target object has been accomplished. This allows the operator to monitor the effect of the operation being conducted on the object.

The methods of the invention are usable by individuals conducting virtually any operation associated with an object, including without limitation any form of machining, welding, construction, assembly, or maintenance operation. It may also include instances where a status of the object is changed. An example of this is an instance where the object is a component in an electrical circuit and the operator is required to effect a change in the connectivity or energization status of that component.

Of particular interest are operations involving direct modification or correction of target objects. This includes instances where a machining operation is required to bring a particular part or surface to a desired geometry or condition. The methods of the invention can be used to assist in any such machining operation, but have particular facility in shipboard machining operations such as those required to correct for large deviations in environment structures.

One particular example of this is the correction of distortions due to welding operations in ship construction. Currently, one of the cost drivers of the welding process is correcting the distortion that occurs in the welded components due to the physical forces exerted on the welded material by the weld bead as it cools and shrinks. This distortion can result in extensive rework if it is not properly controlled, but even when controlled, there still is often a need for implementing corrective measures to bring a welded structure into compliance with design specifications.

There are a number of corrective processes that might be used to prevent, reduce or eliminate the effects of weld distortion, including, but not limited to methods such as restraining, weld sequencing, mechanical straightening, flame straightening, peening (shaping by striking with the peen of a hammer), and post heating. Much of the expertise required for predicting distortion, and in determining and performing the most effective corrective actions, results from a greater than average understanding of welding techniques, material properties, and limitations of equipment. This expertise is most often obtained only through years of experience. However, for many industries that are undergoing a high rate of retirement of experienced workers, resulting in a large percentage of their workforce having five years or less work experience, it is becoming increasingly difficult to maintain the level of experience that is required.

The methods of the present invention can be used to provide a system for presenting an augmented reality display to assist in preventing and correcting distortion. The system addresses the experience problem by providing workers with a method and apparatus for visually mapping distorted or expected distortion areas and comparing them to design parameters. The system provides workers with, not only the location of weld distortion, but also recommended methods by which the distortion may be corrected or prevented.

As previously noted, while the primary examples and illustrative embodiments used herein relate to plate welding for ships and other vessels, it will be understood that the methods of the invention are not limited to such environments. The invention can be used without limitation in any construction environment where welding and correction of weld distortion is performed.

When welders are required to weld one or more large plates together to make a larger planar surface, such as a deck for a ship or vessel, the resulting surface often is not planar at the conclusion of welding, but exhibits one or more distortions such as a contoured or wavy surface having high and low areas, or a bowed configuration where both plates on either side of a weld joint are pulled upward. This is primarily due to the shrinkage of the weld bead in both the transverse and longitudinal directions as it cools. The deck is required to have flatness within a specified tolerance requiring that inspectors measure the surface flatness to determine whether there are areas that may be out-of-tolerance. There are several metrological means of determining surface flatness using three dimensional numerical data including, but not limited to digital photogrammetry, computerized theodolites systems, total stations, laser trackers, and digital coordinate measurement machines. Any of these methods can provide accurate three dimensional coordinate data that may be processed in real-time or later processed after all target point images are measured.

While particular emphasis is placed on planar surfaces in this disclosure, it will be understood that the described distortions may also occur in welded structural elements having other predetermined contour shapes. Such distortions could occur, for example, in welded plates formed to provide a surface with a particular three dimensional curvature (e.g., the curved surface of a cylinder or sphere). It should therefore be understood that while the examples used herein relate primarily to planar structures and surfaces, the methods and systems of the present invention are equally applicable to other predetermined contours. It will also be understood that while the correction operations discussed in the examples below are presented in the context of distortions created by welding operations, the methods of the invention are usable to display and assist in the correction of surface deviations regardless of source.

Figure 3:
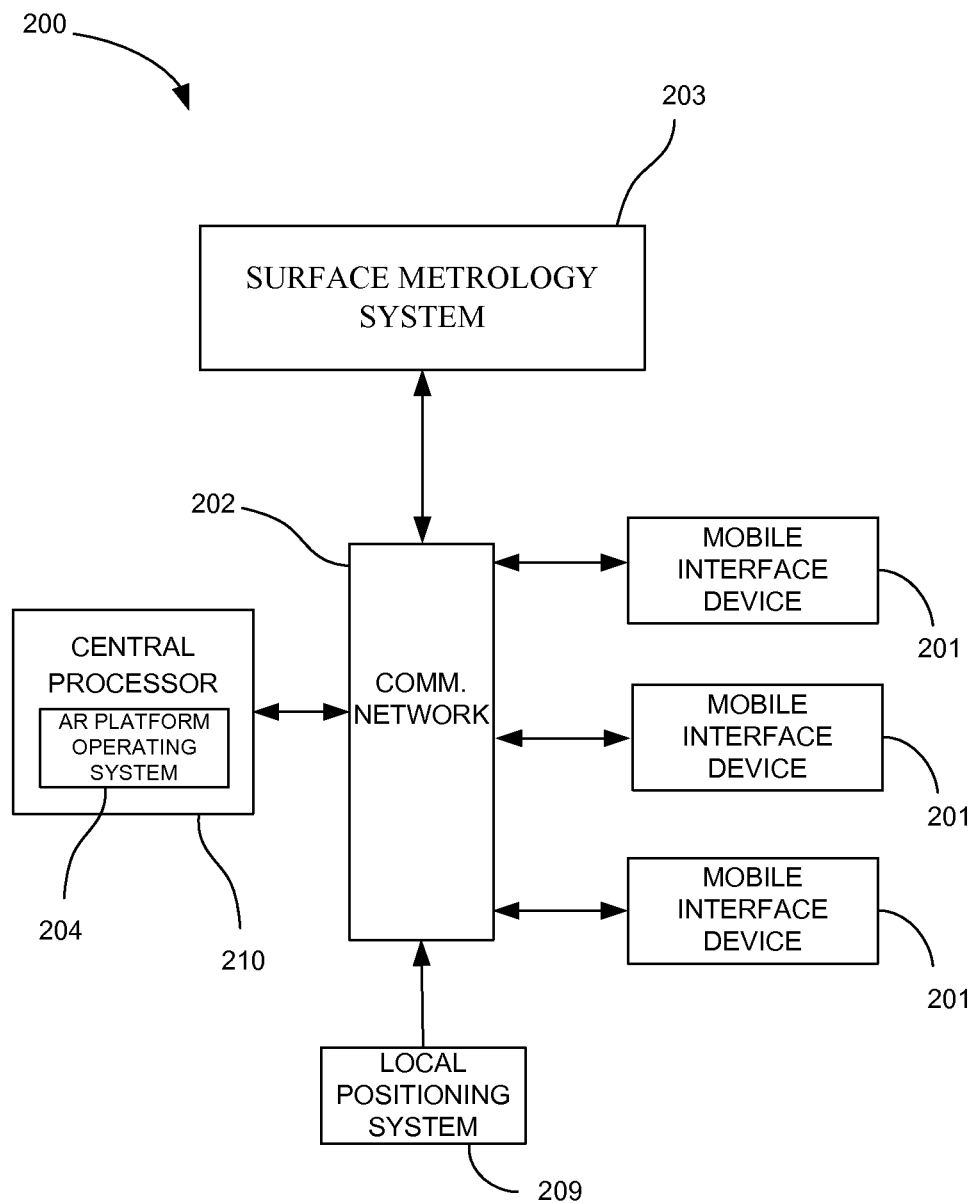
FIG. 3 is a schematic representation of a system for providing target object surface information to a mobile interface device according to an embodiment of the invention.

FIG. 3 illustrates a surface distortion display system 200 according to an embodiment of the invention that can be used to implement a distortion display method. The system 200 is essentially a specific variation of the generalized AR display system 100 of FIG. 1. It is noted that system 200 illustrates only a single instance of each component. It will be appreciated that multiple instances of these components may be used and that the system 200 may include other devices not shown in FIG. 3. It will be understood that in many environments, the system 200 will interface with other systems such as, for example, the operating system of a shipboard operations and maintenance platform as described in the '650 application.

The system 200 comprises a central processor 210 in communication with one or more mobile interface devices 201 via a communication network 202. The mobile interface device 201 may be any mobile computing solution that is integratable into the system 200. The mobile interface device 201 may be, for example, a tablet computer, a smartphone, or a wearable heads-up display. The central processor 210 may include or be in communication with a relational database structure (not shown) as described in the "'650 application. The central processor 210 may be configured to receive information from a local positioning system 209 via the communications network 202 or via a different network and use such information along with information from a mobile device 201 to determine a pose of the device 201 relative to a target object.

The central processor 210 is configured to receive captured target object information from the mobile interface devices 201 and to extract information relating to target object, generate AR information for display on a requesting mobile interface device, and transmit the AR information to the requesting mobile interface device 201.

The central processor 210 is also configured to receive surface measurement information via the network 202 (or another network) from a surface metrology system 203. The surface metrology system 203 may be or include any one or more distortion measurement systems for locating and measuring surface distortion parameters discretely or continuously. The surface metrology system 203 may take a weld (or other) distortion reading on a target object either manually or automated periodically. A translator (not shown) may be used to convert these readings into digital signals compatible for standard transmission over the communication network 202. The surface metrology system 203 may use a combination of lasers, theodolites, photographs, optical telescopes or other measuring devices to measure surface topography in three dimensions. This information can then be provided to the central processor 210. The central processor 210 is configured to receive the surface measurement information and compare it to a specified surface topography for the target object. The central processor is further configured to determine the deviation between the measured surface topography and the desired surface topography (i.e., the surface distortion).

In some embodiments, the surface metrology system 203 may be used to calculate distortion information and transmit such information and/or surface measurement information directly to the one or more mobile interface devices 201 and/or to the central processor 210 via the communication network 202.

Figure 4:
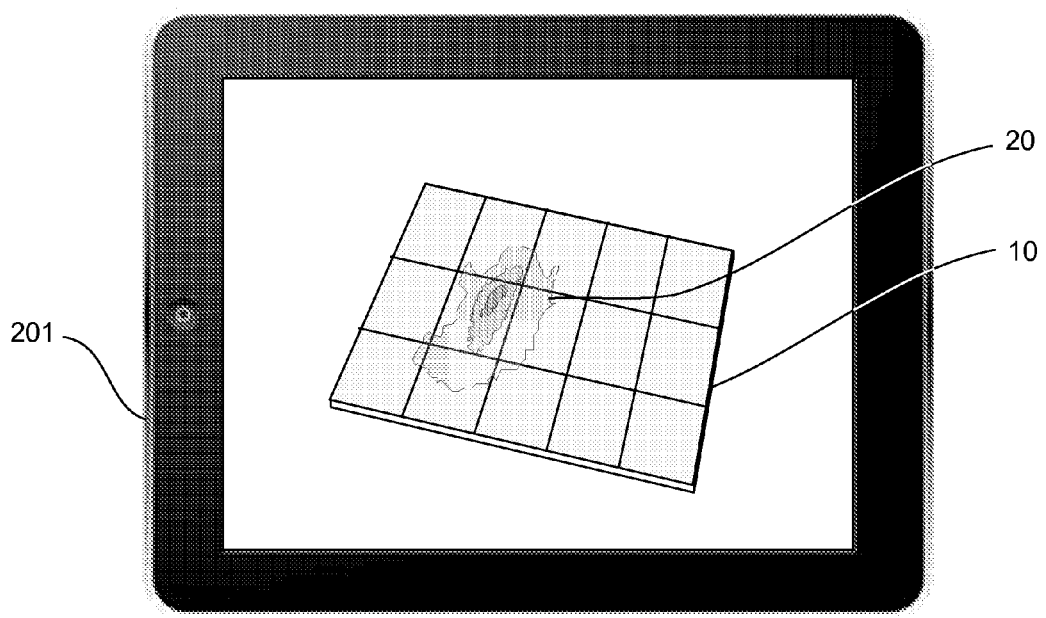
FIG. 4 is an illustration of a mobile interface device user having a target object and exemplary AR surface deviation information displayed thereon in accordance with an embodiment of the invention.

The central processor may be configured to use the surface measurement and/or the surface distortion information along with pose information for the requesting mobile interface device 201 to generate AR information that can be transmitted to the mobile interface device 201 for display. Such AR information may include, for example, an AR image of the desired surface topography or a graphical representation of the surface distortion. As shown in the exemplary mobile device display depicted in FIG. 4, an AR image 20 of surface deviations from the desired surface of a target object (in this case, a planar floor panel) could take the form of a topographical map in which variations in predefined ranges are represented by color density variations. In the illustrated example, the tone density of the illustrated regions are darker for larger convex deviations from the planar surface.

The central processor may be configured to provide the AR information in a wide variety of forms. Visual contour style displays may be provided that show out-of-tolerance areas by the intensity of color and/or the closeness of contour lines. The AR information may also be provided as specific text or other information pertaining to the required weld or machining sequence or other distortion correction approach to prevent, counteract, or correct the distortion caused by the welding process. The mobile device user can then follow established protocol to correct the out-of-tolerance areas on the object. In another variation, the AR information may include a 3-dimensional augmented image of the proposed design overlaid on the as-built design in the correct pose, thus allowing the worker to visualize in real-time or near real time the out-of-tolerance areas without the need to make field measurements.

In some embodiments, the system 200 may provide the worker with specified correction factors and a recommended approach for bringing the surface flatness (or other desired topography) to within prescribed tolerances such as through flame straightening, induction heating, or other methods.

While the methods of the invention are particularly valuable for operations such as plate welding, it will be understood that they are usable in any type of welding or other operation to allow a worker to visualize the difference between what was expected or required by drawing or 3D model and an as-built condition. The as-built tolerances may be compared to a 3D model, or other representation of the intended design, for example, and the resulting information may be visually provided to a worker through augmented reality in real time so that corrections may be made during the fabrication process.

It can therefore be seen that the present invention provides the ability for a worker to use a mobile interface device to visualize the peaks and valleys and other out-of-tolerance areas on the surface of an object without having to physically compare measurements to those set forth in drawings or other specifications. The system 200 provides the worker with a visual representation of distortions in two or three dimensions that can be superimposed over a real-time camera view of the surface using augmented reality display techniques. Workers may use this visualization to determine where corrections must be made to the surface and what methods to follow to fair the surface to within established tolerances.

Figure 5:
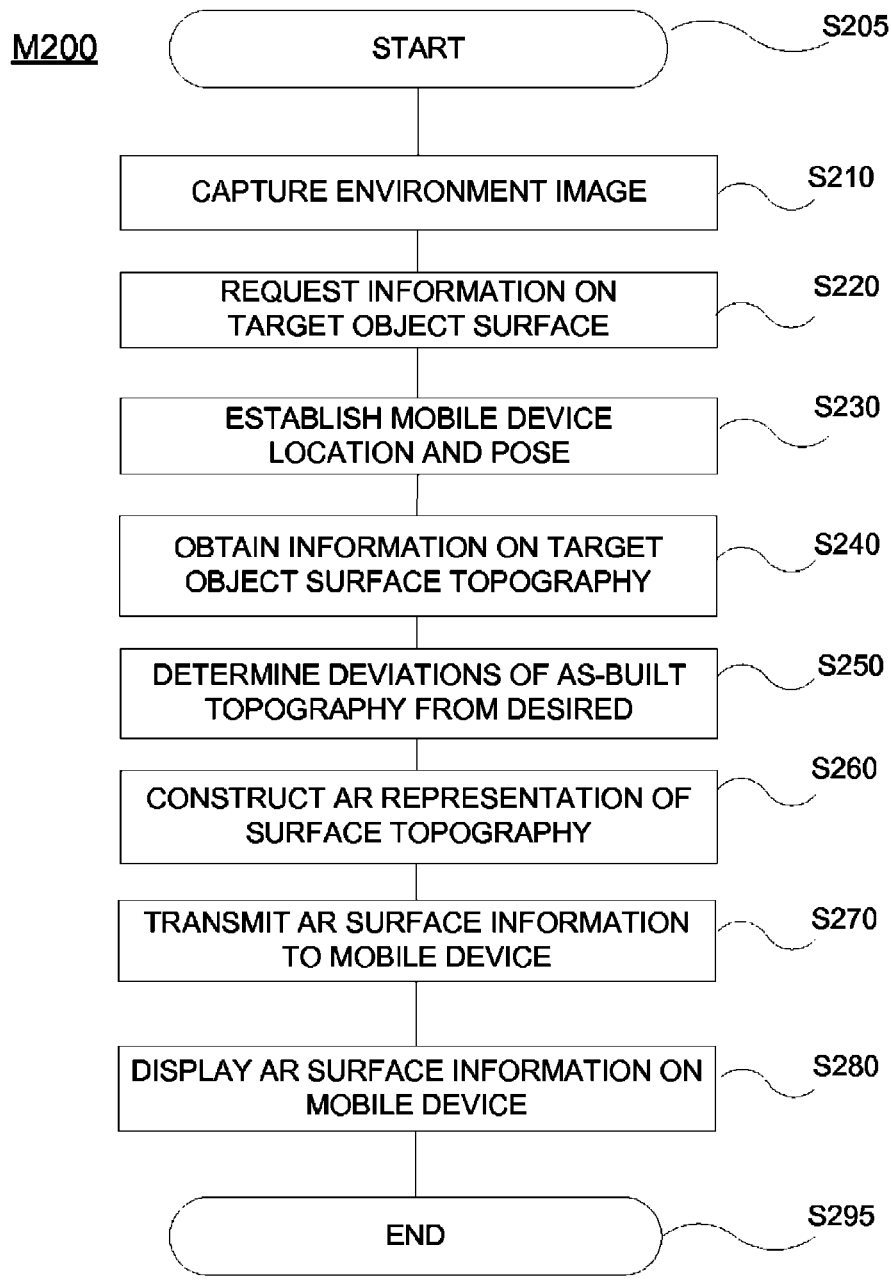
FIG. 5 is a flow diagram of a method of providing target object information to a mobile interface device according to an embodiment of the invention.

With reference to FIG. 5, an exemplary method M200 uses surface distortion display system 200 to provide surface distortion information to a mobile device user. The method begins at S205. At S210, the user uses the mobile interface device 201 to capture a digital image of a target object or a portion of a target object having a particular surface of interest. At S220, a request for information on the target object surface is sent from the mobile interface device 201 to the central processor 210 over the network 202. The request may include information usable by the central processor 210 to determine the target object and the surface of interest and to determine the exact location and pose of the mobile interface device 201 with respect to the target object. The information sent from the mobile interface device 201 may include some or all of the captured digital image of the target object. At S230, the central processor 210 uses the request information along with information from the local positioning system 209 to establish the exact location and pose of the mobile interface device 201 relative to the target object. In some embodiments, the pose of the mobile device 201 may be determined by the mobile device 201 itself. In such embodiments, pose information may be transmitted by the mobile device 201 to the central processor 110.

At S240, the central processor obtains information on the target object surface topography. This may include obtaining information on the current surface topography obtained from surface measurements (i.e., the "as-built" or "post-distortion" topography) and/or information on the specified/desired surface topography. The current surface topography may be established using contemporaneous surface measurements or based on measurements previously provided to the system. The measured surface topography can be provided in terms of the spatial location within the established environment coordinate system. Measurements may be taken dynamically using any suitable measuring system including, but not limited to any of the metrology measurement systems previously disclosed.

At S250, the measured surface topography information may be used to compute deviations between the measured topography and a desired topography. This can be done for specific points or areas on the target object surface. It will be understood that there are some instances where it may be desirable to continuously or periodically re-measure current surface topography and re-determine the current deviations from a desired topography. This allows, for example, an operator to see the effect of his corrective operations on such deviations and/or the occurrence of new deviations caused by such corrective efforts.

It will be understood that in some cases, there is no need to determine the actual surface deviations. For example, there are some instances where it is sufficient to provide information on the desired surface condition/topography only. In such cases, S250 can be omitted.

At S260 a rendering engine on the central processor 210 uses the target object surface information (measured topography, desired topography, and/or surface deviations) along with mobile device pose information to construct an AR representation of the target object surface information of interest. In preferred embodiments, this includes graphically rendering a visual display that can be superimposed over the view of the target object surface captured by the mobile interface device 201. The display may be in the form of a surface density diagram, topographical map showing peaks and valleys to indicate the direction and extent of weld or other distortion, colored surfaces varying in size and color to indicate location and extent of the distortion, or other notional user view of weld distortion visualization as described above. At S270, AR surface information, which is or includes the AR representation of the constructed in S260, is transmitted to the mobile interface device 201. At S280, some or all of the AR surface information is displayed on the mobile interface device 201. In preferred embodiments, the graphical AR rendering of the surface information is superimposed over the displayed image of the target object surface so that the user is able to easily view the desired surface topography, the surface deviations, or other desired information. The method ends at S295.

It will be understood that, once requested, some or all of the actions of the method M200 may be repeated to periodically or continuously provide real-time target object information to the mobile interface device 201.

In the context of distortions created by welding operations, the present invention may utilize any of the aforementioned or other methods available for providing weld distortion information to a worker in a construction environment including but not limited to:

1. A live reading of the current weld distortion levels which either provides the user with a visualized onsite weld distortion rendering and/or gives the worker a prescribed approach to executing weld distortion correction; and
2. An estimation of the expected patterns of weld distortion given known or estimated values and known geometries, material and other welding parameters such as voltage, current, ambient and material temperatures, speed, and other conditions that may affect the welding process. These estimations are frequently used in pre-planning of work evolutions throughout the construction process.

There are no known methods which provide workers with a visualized real-time situational awareness of weld distortion both during the process of welding and after completion of welding materials subject to distortion. The present invention is intended to make the presence of weld distortion not only perceivable to human operators, but properly displayed relative to their spatial location. The present invention thus solves the visualization problem as well as other shortcomings of the prior art.

As has been discussed, while the systems and methods of the present invention have a particular value when applied to vessels and other mobile structures, they may also be applied to stationary buildings and other structures as well. In stationary environments, GPS and GIS information are typically available and may be used by the operating system. The invention is, however, of particular utility in shipboard or other mobile/dynamic environments in which GPS information may be unreliable or unavailable. As has also been discussed, the present invention also addresses the problem of dynamic changes in structure and relative positioning such as are often encountered in large vessels. It will be understood that in some embodiments, the invention may be usable in a setting in which the user is not inside a structure and that the term "structural environment" may encompass exterior structural settings.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for providing target object information to a mobile interface device user in a dynamic structural environment in the form of a dynamic structure having an environment coordinate system, the method comprising:
    receiving on a central data processor from the mobile interface device over a communication network a request for target object information associated with a target object in the dynamic structural environment;
    determining the pose of the mobile interface device relative to the target object;
    obtaining target object data for one or more measurable target object parameters;
    assembling augmented reality (AR) target object information for transmission to and display on the mobile interface device, the AR target object information being assembled using the target object data and being configured for viewing in conjunction with a real-time view of the target object captured by the mobile interface device; and transmitting the AR target object information to the mobile interface device, wherein the action of determining the pose of the mobile interface device relative to the target object accounts for spatial changes in the environment coordinate system resulting from changes in the dynamic structural environment, and wherein the AR target object information includes information configured to assist a user of the mobile interface device in conducting an operation to modify a structural feature of the target object, the operation comprising at least one of the set consisting of a machining operation, a welding operation, and an assembly operation.

2. A method according to claim 1, wherein at least the actions of obtaining target data, assembling AR target object information and transmitting the AR target information are repeated after at least a portion of the operation has been accomplished.

3. A method according to claim 1, wherein the mobile interface device is one of the set consisting of a tablet computer, a smartphone, and a wearable heads-up display.

4. A method according to claim 1 wherein the request for target environment information includes a digital image of the target object captured by the mobile interface device.

5. A method according to claim 1 wherein the request includes information usable by the central data processor to determine the pose of the mobile interface device relative to the target object and the action of determining includes:
receiving mobile interface device location information from a local positioning system, said location information being provided in a coordinate system associated with the dynamic structure; and
using the location information and the digital image to determine the pose of the mobile interface device.

6. A method according to claim 1 wherein the action of determining includes:
receiving pose information from the mobile interface device.

7. A method according to claim 1 wherein dynamic structure defines an interior space in which the target object is disposed.

8. A method according to claim 1 wherein the dynamic structure comprises the target object.

9. A method according to claim 1 wherein the spatial changes result from flexure of the dynamic structure.

10. A method according to claim 1 wherein the action of obtaining target object data includes:
receiving measured target object data from a measurement data system.

11. A method according to claim 10 wherein the AR target object information includes a graphical representation of at least one target object parameter, the graphical representation being constructed using the target object data.

12. A method according to claim 10 wherein the measured target object data comprises measured surface topography.

13. A method according to claim 12 wherein the AR target object information comprises a target object surface deviation topography and wherein the action of assembling AR target object information includes:
comparing the measured surface topography to a desired surface topography to determine the target object surface deviation topography.

14. A method according to claim 13 wherein the AR target object information includes a graphical representation of the target object surface deviation topography that can be superimposed over the real-time view of the target object captured by the mobile interface device.

15. An automated system for providing target object information to a mobile interface device in a dynamic structural environment in the form of a dynamic structure having an environment coordinate system, the system comprising:
at least one mobile interface device configured for variable disposition within the dynamic structural environment, capturing information about a target object within the structural environment, and transmitting the target object information over a network;
a local positioning system in communication with the at least one mobile interface device via the network and configured to provide information usable to determine a mobile interface device pose relative to the target object in the environment coordinate system; and
a central processor comprising at least one data processing machine in communication with the at least one mobile interface device and the local positioning system via the network, the central processor being configured for
receiving from a requesting one of the at least one mobile interface device a request for target object information, the request including information usable to determine the mobile interface device pose relative to the target object;
determining the pose of the requesting mobile interface device relative to the target object;
obtaining target object data for one or more measurable target object parameters;
assembling augmented reality (AR) target object information for transmission to and display on the requesting mobile interface device, the AR target object information being assembled using the target object data and being configured for viewing in conjunction with a real-time view of the target object captured by the requesting mobile interface device; and
transmitting the AR environment information to the requesting mobile interface device,
wherein the action of determining the pose of the mobile interface device relative to the target object accounts for spatial changes in the environment coordinate system resulting from changes in the dynamic structural environment, and
wherein the AR target object information includes information configured to assist a user of the mobile interface device in conducting an operation to modify a structural feature of the target object, the operation comprising at least one of the set consisting of a machining operation, a welding operation, and an assembly operation.

16. A system according to claim 15 further comprising:
an environment data system configured for capturing the target environment data.

17. A system according to claim 16 wherein the environment data system comprises a surface metrology system configured for measuring a topography of a surface of the target object.

18. A method for providing surface topography information for a target object to a mobile interface device user in a dynamic structural environment in the form of a dynamic structure having an environment coordinate system, the method comprising:
receiving on a central data processor from the mobile interface device over a communication network a request for target object surface information associated with a target object in the dynamic structural environment, the request including information usable by the central data processor to determine the pose of the mobile interface device relative to the target object in the environment coordinate system;

determining the pose of the mobile interface device relative to the target object;

obtaining target object surface data;

assembling augmented reality (AR) target object surface information for transmission to and display on the mobile interface device, the AR target object information being assembled using the target object surface data and being configured for viewing in conjunction with a real-time view of the target object captured by the mobile interface device; and transmitting the AR target object information to the mobile interface device, wherein the action of determining the pose of the mobile interface device relative to the target object accounts for spatial changes in the environment coordinate system resulting from changes in the dynamic structural environment, and wherein the AR target object information includes information configured to assist a user of the mobile interface device in conducting an operation to modify a surface feature of the target object, the operation comprising at least one of the set consisting of a machining operation, a welding operation, and an assembly operation.

19. A method according to claim 18, wherein the action of obtaining target object surface data includes:

measuring a surface topography of a surface of the target object.

20. A method according to claim 18 wherein the AR target object information includes information configured to assist a user of the mobile interface device in correcting a deviation from a desired surface topography on a surface of the target object.

21. A method according to claim 18 wherein the spatial changes result from flexure of the dynamic structure.

22. A method according to claim 18, wherein the target object surface data includes a desired surface topography of a surface of the target object.

23. A method according to claim 22, wherein the action of obtaining target object surface data includes:

measuring a surface topography of the surface of the target object; and comparing the measured surface topography to the desired surface topography to determine a surface deviation topography for the surface of the target object.

24. A method according to claim 23, wherein the action of assembling AR target object information includes:

constructing a graphical representation of the surface deviation topography for display on the mobile interface device, the graphical representation being included in the AR target object surface information.

25. A method according to claim 23, wherein the action of assembling AR target object information includes:

constructing a graphical representation of the desired surface topography for display on the mobile interface device, the graphical representation being included in the AR target object surface information.

* * * * *